(12) United States Patent
Gervelmeyer

(10) Patent No.: US 11,364,860 B2
(45) Date of Patent: Jun. 21, 2022

(54) EXTERIOR GLASS TRIM ELEMENT FOR VEHICLE

(71) Applicant: AGC GLASS EUROPE, Louvain-la-Neuve (BE)

(72) Inventor: Rolf Gervelmeyer, Geilenkirchen (DE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 759 days.

(21) Appl. No.: 16/085,350

(22) PCT Filed: Mar. 15, 2017

(86) PCT No.: PCT/EP2017/056135
§ 371 (c)(1),
(2) Date: Sep. 14, 2018

(87) PCT Pub. No.: WO2017/158031
PCT Pub. Date: Sep. 21, 2017

(65) Prior Publication Data
US 2019/0077337 A1    Mar. 14, 2019

(30) Foreign Application Priority Data

Mar. 17, 2016 (EP) .................................... 16160906

(51) Int. Cl.
*B32B 15/04* (2006.01)
*B32B 17/06* (2006.01)
*B60R 13/04* (2006.01)
*B32B 17/10* (2006.01)
*B32B 7/12* (2006.01)

(52) U.S. Cl.
CPC ............... *B60R 13/04* (2013.01); *B32B 7/12* (2013.01); *B32B 17/10* (2013.01); *B32B 17/10018* (2013.01); *B32B 17/10036* (2013.01); *B32B 17/1077* (2013.01); *B32B 17/10091* (2013.01); *B32B 17/10137* (2013.01); *B32B 17/10247* (2013.01); *B32B 17/10541* (2013.01); *B32B 2605/08* (2013.01)

(58) Field of Classification Search
CPC .................................................. B32B 2605/08
USPC ........................................................ 428/426
See application file for complete search history.

(56) References Cited

U.S. PATENT DOCUMENTS

| 3,547,515 A | 12/1970 | Shanok et al. |
| 4,830,892 A * | 5/1989 | Nussbaum ........ B29C 45/14467 156/293 |
| RE36,457 E * | 12/1999 | Ellison .................... B32B 27/08 428/31 |

(Continued)

FOREIGN PATENT DOCUMENTS

| FR | 2 948 906 A1 | 2/2011 |
| GB | 1 248 113 | 9/1971 |

(Continued)

OTHER PUBLICATIONS

International Search Report dated May 18, 2017, in PCT/EP2017/056135 filed Mar. 15, 2017.

*Primary Examiner* — Lauren R Colgan
(74) *Attorney, Agent, or Firm* — Oblon, McClelland, Maier & Neustadt, L.L.P.

(57) ABSTRACT

An exterior trim element for a motor vehicle which includes a cover part made of glass disposed on a support member.

17 Claims, 2 Drawing Sheets

(56) References Cited

U.S. PATENT DOCUMENTS

| | | | |
|---|---|---|---|
| 6,815,070 B1* | 11/2004 | Burkle | C03C 17/32 428/425.6 |
| 7,866,861 B2* | 1/2011 | Alexander | B60Q 1/50 362/503 |
| 9,920,566 B1* | 3/2018 | Bennett | E06B 1/26 |
| 10,808,452 B2* | 10/2020 | Kim | B32B 7/12 |
| 2007/0279560 A1* | 12/2007 | Ishitani | G02F 1/133502 349/116 |
| 2013/0127202 A1* | 5/2013 | Hart | B32B 17/10761 296/146.1 |
| 2013/0128433 A1* | 5/2013 | Dannoux | G06F 1/1601 361/679.01 |
| 2013/0140840 A1* | 6/2013 | Schulte | B29C 45/0001 296/1.08 |
| 2013/0242562 A1* | 9/2013 | Labrot | B32B 17/10018 362/259 |
| 2014/0141206 A1* | 5/2014 | Gillard | B32B 17/10036 428/174 |
| 2014/0375073 A1 | 12/2014 | Schmidt et al. | |
| 2015/0032328 A1* | 1/2015 | Healey | G09F 21/049 701/36 |
| 2015/0174861 A1* | 6/2015 | Hasegawa | B32B 17/10743 428/337 |
| 2015/0375673 A1* | 12/2015 | Testai | B60Q 1/268 362/545 |
| 2016/0104437 A1* | 4/2016 | Iwakawa | B60J 3/04 345/690 |
| 2016/0229155 A1* | 8/2016 | Sienerth | B60J 1/02 |
| 2017/0197561 A1* | 7/2017 | McFarland | B60R 13/04 |
| 2018/0178734 A1* | 6/2018 | Butsch | B32B 17/10018 |

FOREIGN PATENT DOCUMENTS

| | | |
|---|---|---|
| WO | WO 2015/058884 A1 | 4/2015 |
| WO | WO 2016/007815 A1 | 1/2016 |

* cited by examiner

EXTERIOR GLASS TRIM ELEMENT FOR VEHICLE

The invention relates to an exterior glass trim element for a motor vehicle. In particular, it may be in the design part of a A-, B- and C-pillar of a motor vehicle.

Today, consumer wants to have the opportunity to choose color and material used as exterior trim element of his vehicle, he wants to customize it. The consumer wants to be able to purchase several styles of vehicle trim placed in different parts of the exterior vehicle, the most popular trim elements being chrome or plastic. Some others trims element are available in the market. For example, pinstriping can be used. The pinstriping is a special plastic tape on a removable backing that is applied on several areas of a vehicle.

However, in many vehicles, exterior plastic or metal trims are disposed to cover unaesthetic part of the exterior vehicle and particularly at the A-, B- and C-pillar. For example, in order to make the exterior of the car more beautiful, the vertical or near vertical supports of a car's window area—designated respectively as the A, B, C or (in larger cars) D-pillar, moving from the front to rear, in profile view—are usually decorated with plastic or metal panels covering the exposed parts of the exterior vehicle.

Trim element in the form of a pillar finisher is known from DE 202 01 528 U1 or EP1695808. The trim described in these documents comprises thermoplastic as a cover part disposed on a carrier part made also of plastic. However, the trim element of the prior art are rather sensitive to scratches and not really aesthetic particularly when high gloss disappears.

Furthermore, the plastic material or others classically used material used to cover some part of the exterior of vehicle are not highly resistant to scratches, to UV and the tint deteriorated with time (deterioration of the design and color).

In view of the foregoing prior art problems, it is an object of the present invention to provide an improved exterior trim element for vehicle with a good aesthetic and more resistant to scratches than trim elements of the prior art.

Thus, the present invention concerns an exterior trim element for a motor vehicle. According to the present invention, the exterior trim element comprises a cover part made of glass disposed on a support member.

More particularly, the present invention proposes glass trim element for A, B- and C-pillar of a vehicle.

The solution as proposed in the present invention offers a high-quality solution with new design possibilities, a better scratch resistance, a better chemical resistance, and future possibilities to upgrade the glass trim element for example by affixing a logo, a laser engraving, a light, glass color and touch functionalities . . . .

According to one embodiment of the present invention, the exterior trim element comprises a cover part made of glass and a support member made of thermoplastic or duroplastic or liquid silicon rubber (LSR) material. The cover part is provided on a visible surface of the trim element. It may fulfill a decorative function. In certain applications, it may be advantageous if the cover part assumes one or more additional features over the decorative function. Specifically, the cover part is preferably configured to be more resistant to weathering. The trims elements made of glass sheet may host different functionalities around electronic gadgetry and vehicle control information, for example.

The support member may have mechanical functions. In particular, the support member may have functional properties such as preventing impact strength, breakage, improving the resistance to twisting, improving the fixation of the cover part, supporting mount attachments (seals, piping, etc.) . . . .

According to one embodiment of the present invention, the support member is preferably made of plastic. Advantageously, the support member is made of thermoplastic or duroplastic or liquid silicone rubber (LSR) material. Suitable plastics are for example PMMA, ABS, ABS/PC and/or ASA plastics especially comprising glass fibers.

According to the invention, the cover part is mounted on the support member and preferably on any part in the exterior vehicle to be covered in order to provide a better aesthetic or to secure some part of the exterior's vehicle. Particularly, the trim element according to the present invention covers some parts of A, B- and C-pillar of the exterior's vehicle.

In a preferred embodiment of the invention, the trim element is made of in one piece of glass sheet extended along the part to be covered.

According to another embodiment of the invention, the trim element can be made of several pieces of glass sheet, depending on the needs for harboring functions.

According to another embodiment of the invention, some lighting means as for example electroluminescent, OLED, LED, special glass paint/enamel backing, may be integrated into the trim element or on its edges.

According to one embodiment of the invention, the glass cover part may be glued or fixed to the support member of the exterior vehicle to be covered. The trim element is fixed to the exterior's vehicle on the part to be covered by such as trim element.

According to the invention, the cover part of the trim element is made of flat glass sheet which can be bended or thermoformed to adapt with the shape of the car. The flat glass sheet may be processed to be decorative or in order to give an access to auxiliary power point, etc.

According to a preferred embodiment of the present invention, the trim element made of glass is hot bended. It is foreseen to use the "applique" on all car pillars (A, B, C and D). Even if the curvature of the A, B and C-pillar looks very cylindrical, in most cases it is a 3D-bended part. This is done to keep the same reflection optic with the other side glasses. Thus, it will be very difficult to a apply a cold bending process for a 3D bended cover glass. Especially the shape of a cover for the D-pillar could be very complex and very large. In many cases, this shape is strongly bended (to close the gap between the rear side glass (QLF) and the backlite of the carbody). To achieve this shaping, a "hot bending" process is preferable.

The glass according to the invention is made of glass which can belong to various categories. The glass can thus be a glass of soda-lime-silica, aluminosilicate or borosilicate type, and the like. Preferably and for reasons of lower production costs, the glass sheet according to the invention is a sheet of soda-lime-silica glass.

In one non limiting embodiment, the basic composition of the glass according to the invention comprises, in a content expressed as percentages by total weight of glass:

| | |
|---|---|
| $SiO_2$ | 55-85% |
| $Al_2O_3$ | 0-30% |
| $B_2O_3$ | 0-20% |

-continued

| | |
|---|---|
| Na2O | 0-25% |
| CaO | 0-20% |
| MgO | 0-15% |
| K2O | 0-20% |
| BaO | 0-20%. |

In another embodiment, the basic composition of the glass according to the invention comprises, in a content expressed as percentages by total weight of glass:

| | |
|---|---|
| SiO2 | 55-78% |
| Al2O3 | 0-18% |
| B2O3 | 0-18% |
| Na2O | 0-20% |
| CaO | 0-15% |
| MgO | 0-10% |
| K2O | 0-10% |
| BaO | 0-5%. |

In another embodiment and for reasons of lower costs, the glass is a soda-lime glass. Advantageously, the basic composition of the glass according to the invention comprises, in a content expressed as percentages by total weight of glass:

| | |
|---|---|
| SiO2 | 60-75% |
| Al2O3 | 0-6% |
| B2O3 | 0-4% |
| CaO | 0-15% |
| MgO | 0-10% |
| Na2O | 5-20% |
| K2O | 0-10% |
| BaO | 0-5%. |

According to an advantageous embodiment of the invention, the composition of the glass sheet may additionally comprise one or more component (s)/colorant(s) in an appropriate amount as a function of the effect desired. This/these component (s)/colorant(s) may be used, for example, to "neutralize" the colour generated by for example the presence of the chromium and thus to render the colouring of the glass of the invention more neutral or colourless. Alternatively, this/these colorant(s) may be used to obtain a desired colour other than that which can be generated by for example the presence of the chromium.

According to another advantageous embodiment of the invention, which may be combined with the preceding embodiment, the glass sheet can be coated with a layer or a film which makes it possible to modify or neutralize the colour which may be generated by for example the presence of the chromium (for example a coloured PVB film).

The glass sheet according to the invention may advantageously be chemically or thermally tempered in order to enhance the resistivity of the cover part of the exterior trim element.

According to one embodiment of the invention, the glass sheet is coated with at least one transparent and electrically conducting thin layer. A transparent and conducting thin layer according to the invention can, for example, be a layer based on SnO2:F, SnO2:Sb or ITO (indium tin oxide), ZnO:Al or also ZnO:Ga.

According to another advantageous embodiment of the invention, the glass sheet is coated with at least one antireflection layer. An antireflection layer according to the invention may, for example, be a layer based on porous silica having a low refractive index or it may be composed of several layers (stack), in particular a stack of layers of dielectric material alternating layers having low and high refractive indexes and terminating in a layer having a low refractive index. A textured glass sheet may be also used. Etching or coating techniques may as well be used in order to avoid reflection.

According to another embodiment, the glass sheet is coated with at least one anti-fingerprint layer or has been treated so as to reduce or prevent fingerprints. Such a layer or such a treatment may be combined with a transparent and electrically conducting thin layer deposited on the opposite face. Such a layer may be combined with an antireflection layer deposited on the same face, the anti-fingerprint layer being on the outside of the stack and thus covering the antireflection layer.

According to the applications and/or properties desired, other layers can be deposited on one and/or the other face of the glass sheet according to the invention.

The glass sheet according to the invention may be a glass sheet obtained by a floating process, a drawing process, a rolling process or any other process known to manufacture a glass sheet starting from a molten glass composition. According to a preferential embodiment according to the invention, the glass sheet is a float glass sheet. The term "float glass sheet" is understood to mean a glass sheet formed by the float glass process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin).

The glass sheet according to the invention can have a thickness varying between 0.1 and 5 mm. Advantageously, the glass sheet according to the invention may have a thickness varying between 0.1 and 3 mm. Preferably, for reasons of weight, the thickness of the glass sheet according to the invention is from 0.1 to 2.2 mm.

According to the invention, the glass sheet may be totally or partially curved to correctly fit with the particular design of the vehicle.

In order to provide a better esthetic of the exterior vehicle, the trim element may be made of a digital or silk screen printed glass sheet, an etched glass sheet, a painted/enameled glass sheet, a casted glass sheet, an anti-bacterial glass sheet, a colored float glass sheet.

According to another embodiment of the invention, the cover part is made of laminated glass sheet. According to this embodiment, at least one thermoplastic interlayer is used to laminate at least two glass sheets. Advantageously, a colored or active interlayer may be present between the at least two glass sheets.

According to another embodiment of the invention, the at least one trim element is made of heat treated glass sheet, for example annealed or tempered and/or bended glass sheet. Typically, this involves heating the glass sheet (coated or not) in a furnace to a temperature of at least 580° C., more preferably of at least about 600° C. and still more preferably of at least 620° C. before rapidly cooling down the glass substrate. This tempering and/or bending can take place for a period of at least 4 minutes, at least 5 minutes, or more in different situations.

In a preferred embodiment of the present invention, the at least one trim element is made of an annealed glass sheet. During the glass production process, the molten glass is cooled down slowly and under carefully controlled conditions. This annealing process is able to remove undesirable stresses inside the glass. In case of an impact (breakage) the annealed glass will break into small and larger glass parts. As there is no internal stress inside the glass, all these broken glass parts will be fixed to the glue on the backplate. By this, broken glass part will stay on the applique and cannot harm people after an impact in comparison with tempered glass (or semi-tempered or chemically tempered). Indeed, due to the tempering process the glass is forced to cool down rapidly under carefully controlled conditions. This rapid cooling process leaves the center of the glass relatively hot compared to the surfaces. As the center cools down later it forces the surface and the edges into a high compression stress. Thus, if tempered glass breaks, it will shatter into many small splinter. Because of the sudden release of the high inner glass stress, there is a risk, that the glass splinter will not be fully kept by the glue of the appliques, thus resulting in a risk to harm people.

Thus, an exterior glass trim element made of glass sheet according to the invention may provide a trim having one or more of the following advantages:
- a higher mechanical/scratch resistance
- an improved stiffness/weight ratio
- a higher resistance to ageing/weathering (sun irradiation)
- possibility to provide a better finishing/aspect
- possibility to have a transparent cover of the trim element (for back lighting, screen integration, . . . )
- possibility to have a glare control treatment and/or anti-finger prints coating and/or touch function and/or finger print sensor.
- a better hygienic aspect
- some functionalities may be tailor-made for the occupant
- possibility of reconciliation of many different softwares into one single place for one Operating System related to touch function for example.

According to one embodiment of the present invention, the trim element is manufactured by gluing the glass cover part to the support member. This process is particularly suitable when small quantities should be produced (no need to invest on more sophisticated units. For example, a polyurethane glue may be used to glue the cover part to the support member. It is understood that all suitable glue may be used to fix the cover part onto the support member.

According to one embodiment of the present invention, the trim element is produced by encapsulation of the cover part (also called back molding) with a material made of duroplastic or liquid silicon rubber (LSR) or thermoplastic material.

Preferentially, the trim element is produced by encapsulation of the cover part in a multi-component injection molding process, in particular in a two-component injection molding (2K method). Because the cover part is made of glass, it ensures a good scratch and weathering resistance. The 2K back molding process itself enables the usage of two different and dedicated plastic materials for the support element. By this, one plastic material can be used to achieve a high mechanical strength and a good fracture behavior of the trim element. This includes also fixation elements and reinforcing ribs. The fixation elements such as mounting holes, distance holder etc. do allow a fixation to the car body. The reinforcing ribs do support the aim to achieve a low overall weight. During this multi-component process, a second material can be used to achieve additional sealing and damping functions of the trim element (i.e a sealing/damping lip at the edge of the trim element which is much softer and more flexible than the first material used).

When combining glass with plastic by using an encapsulation process, the thermal expansion of the materials used needs to be taken into account. The thermal expansion of duroplastic material is quite close to the one from glass. Thus, when using duroplastic material for the encapsulation, the inside stress level will be significantly lower compared to the usage of thermoplastic material. Another advantage of duroplastic material is the lower pressure needed during the encapsulation process. This will help to reduce the risk of breakage of the glass during the encapsulation process.

When a thermoplastic material is used to encapsulate the glass cover part, a special multi-layer adhesive film, preferentially a thermoplastic polyurethane film (TPU), is generally needed. This film has special layers, with properties adapted to the conditions of the materials which needs to be combined. Thus, during and after the encapsulation, this film acts as an interlayer between glass and thermoplastic material.

Concerning the liquid silicone rubber (LSR), it is widely used in the automotive industry. The thermal expansion is much higher than the one from duroplastic material. However, the e-module of LSR is much lower. Therefore, LSR is able to compensate mechanical stress caused by shrinkage.

According to another embodiment of the present invention, the trim element may comprise one or more further parts. It may be in particular comprises means to seal correctly the trim element. The other parts or means to seal are preferably integrally molded on the trim element, preferably in a multi component injection molding process (2- or 3-component injection molding process).

According to a preferred embodiment of the present invention, a primer is disposed between the support member and the cover part. More particularly, the primer is disposed in face 2 of the cover part, facing the support member, face 1 being the face of the cover part in contact with the exterior. Thus, the support member is bonded to the cover part via the primer. Said differently, the support member bonds to the primer, which is bonded to the cover part, thereby bonding the support member to the glass cover part. According to one embodiment described above, the primer may applied between the cover part and the glue. In case of encapsulation of the cover part to the support member, the primer may be disposed directly between the covert part and the support member which is encapsulated to the cover part. The primer increases a bond strength between the cover part and the support member as compared to a bond strength between the support member and the glass cover part without the primer. Said differently, the support member bonds better to the primer than it does with the glass cover part directly. The primer also serves to conceal an exposed edge of the cover part, which provides a more aesthetically pleasing appearance. The primer is selected from known conventional primers based on the material used to make the encapsulation/fixation of the cover part to the support member. For example, the conventional primers used with the thermoset material chemically react with the thermoset material of the encapsulation/fixation to chemically bond the encapsulation/fixation to the primer. More specifically, the conventional primers used for the thermoset material of the encapsulation/fixation are polyurethane primers, which are isocyanate-based, and react with the thermoset material to form covalent bonds. The conventional primers used for the thermoset material are short chain polymers due to the chemical bond that is to be formed. Alternatively, the conventional primers used with the thermoplastic or duroplastic or LSR material provide an adhesive bond and do not chemically react with the thermoplastic material of the encapsulation/fixation.

More specifically, the conventional primers used with the thermoplastic or duroplastic or LSR material are typically long chain polymers or based on silicone that only mix with the thermoplastic or duroplastic or LSR material, which results in polymer chain entanglement. Generally, the conventional primers used with the thermoset material cannot be used with thermoplastic or duroplastic or LSR material because the conventional primers used with the thermoset material are short chain polymers, which are inadequate for mixing with the thermoplastic or duroplastic or LSR material.

The primer may be transparent or preferably may comprise a colorant to fit with the color of the covert part and/or to mask the support member carrying on the glass cover part. For example, if the cover part is made of black colored glass, the primer may be black colored to provide a good aesthetic and also to mask the support member. A black primer suitable for this application is for example well described in the patent application WO2012/015936.

Other advantages of the present invention will be readily appreciated with reference to the following accompanying drawings wherein.

Figure 1:
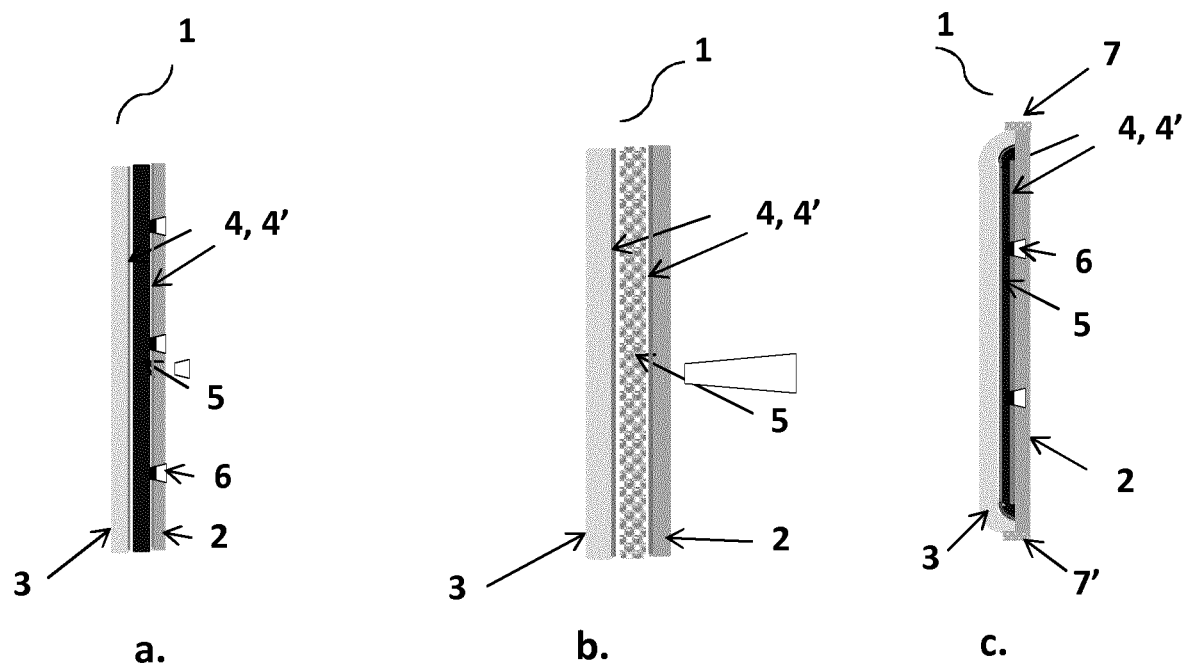
FIGS. 1a to 1c show in a perspective view an exterior trim element wherein the support member and the cover part are fixed together by gluing according to one embodiment of the present invention.

FIGS. 1a to 1c show an exterior trim element 1 according to one embodiment of the present invention comprising a support member 2 and a cover part 3. According to the present invention, the cover part is made of glass. More particularly, the cover glass is made of semi-tempered or preferably annealed glass with a thickness of 1.6 mm. The cover part 3 has on its internal face (face 2) facing the support member 2, a layer of primer 4, for example a layer of a commercial primer known as Dow Betaprime 5500®. The primer permits to bond more efficiently the cover part 3 to the support member 2.

According to this embodiment, the cover part 3 is glued to the support member 2. The glue is disposed between the primer 4 and the support member 2. The glue is for example a polyurethane glue. It is understood that other suitable glue may be applied. For example, such glue may be a PU glue such as the commercial glue known as Dow Betasol BS 8000®. The support member 2 may have any suitable design to fit with the design of the car. The support member 2, onto the glass cover part is placed, is made of plastic and surrounds the glass cover part. The support member 2 fits with the shape of the covert part 3. The support member 2 is fixed to the vehicle, preferably on A-, B- and/or C-pillar of the vehicle by screwing (or fastening) for example. The support member 2 may consist of one or more components depending in part on its fixation process to the glass cover part. It is formed as a carrier element. According to one embodiment of the present invention and as shown in FIGS. 1a to 1c, the cover part 3 made of glass for example a non-tempered or a semi-tempered or chemically tempered (for ultra thin glass), is fixed to a plastic back plate as support member 2 by gluing. The cover part may be glued with for example a PU glue. The support member 2 is may be made of thermoplastic material. The support member (back plate) may be made in PMMA. This material can be made in different colors, in particular black. It can also be made as a transparent material. Further, in particular, the materials ABS, ABS/PC, ASA plastics comprising glass fibers are suitable. The thickness may vary between 1 mm and 100 mm. If the support member is made of ABS, ABS/PC, ASA, comprising glass fibers, the thickness may vary between of 0.5 to 5 mm, preferably between 2.0 and 2.5 mm.

In a particular embodiment, the support member may comprise holes 6 in order to improve the curing of the glue 5. According to one particular embodiment of the present invention, the cover plate is fixed to the support member thanks to a double adhesive tape 5 (for example from Tesa® 64993) (as shown in FIG. 1b). The double adhesive tape 5 may be sandwiched between two layers of primer 4, 4'. According to another particular embodiment of the present invention, the support member 2 (back plate) may cover the upper and/or bottom extremity(ies) 7, 7' (as shown in FIG. 1c) of the cover part for esthetic and/or safety purposes for example. Thus, these parts of the support member may be fixed to the cover plate by gluing for example with a PU glue or by using a double adhesive tape.

According to another embodiment of the present invention, edges (extremities) of the cover part may be bent/curved to be completely integrated into the support member.

To allow and to improve the fixation of the glass cover part 3 to support member 2, a primer 4 is applied on the internal face (face 2) of the cover part faced to support member. A second layer of a primer 4' may be preferably applied on the internal face of the support member faced to the glass cover part. It is understood that the primer is suitable for the type of cover glass and the type of support member. Thus, the glue is sandwiched between two layers of primer.

Figure 2:
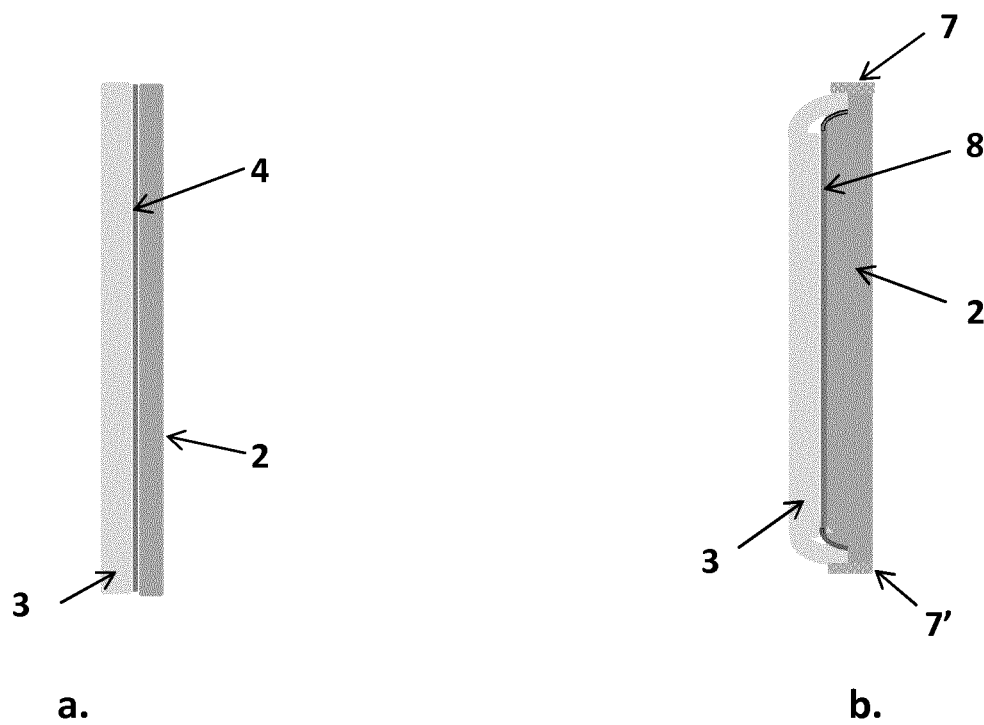
FIGS. 2a and 2b show in a perspective view an exterior trim element wherein the support member and the cover part are fixed together by encapsulation (back molding) according to another one embodiment of the present invention.

FIGS. 2a and 2b show an exterior trim element 1 according to another embodiment of the present invention comprising a support member 2 and a cover part 3. The cover part 3 is made of glass for example a non-tempered or a semi-tempered or chemically tempered (for ultra thin glass) glass or preferably annealed glass. The glass cover part is fixed to a plastic back plate as support member 2 by encapsulation. According to this embodiment, the support member may be made of two or multi-component injection molding. Preferably, the support member is made in duroplastic or liquid silicone rubber material (as for example Elastosil® LR). However, the support member may be made of thermoplastic material as shown in FIG. 2b. According to this embodiment a thermoplastic multi layer adhesive film such as thermoplastic polyurethane (TPU) 8 should be applied on glass in order to allow the fixation of the glass cover part to the support member (back plate). Indeed, to combine a thermoplastic material with glass, a special multi layer adhesive film (TPU) (for ex. "nolax 522.2202" film from company "nolax") is generally needed. This film 8 has special layers, with properties adapted to the conditions of the materials which needs to be combined. During and after the encapsulation, this film acts as an interlayer between glass and thermoplastic material.

To allow and to improve the fixation of the glass cover part to support member, a primer 4 is applied on the internal face (face 2) of the cover part faced to support member.

According to the present invention, edges (extremities) 7, 7' of the cover part 3 may be bent/curved to be completely integrated into the support member 2. According to another embodiment of the present invention, support member may comprise means to seal correctly the trim element. The other parts or means to seal are preferably integrally molded on the trim element, preferably in a multi component injection molding process (2- or 3-component injection molding process). For example, the sealing of the cover part may be provided by a the support member comprised at its ends (extremities) a softer material made by 2K encapsulation. Thus the glass cover part 3 will be sealed in its edges with the support member 2 and will be fully integrated into the support member.

The thickness of the support member may vary between 1 to 100 mm. It is understood that the thickness of the support member will be adapted to the type of material used but also the technology used to fix it to the cover part (gluing or encapsulation). For example, if PMMA is used, the thickness may vary between 1 mm and 100 mm. If the support member is made of ABS, ABS/PC, ASA, the thickness may vary between of 0.5 to 5 mm, preferably between 2.0 and 2.5 mm.

Figure 3:
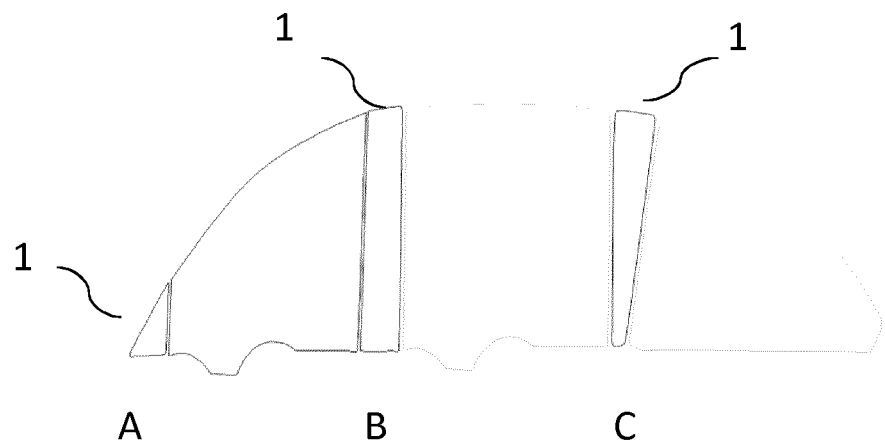
FIG. 3 shows examples of possible locations of a trim element according to the present invention.

FIG. 3 show an exterior trim element 1 according to the present invention applied in A-, B- and C-pillars; A- and B-pillars being separated by the front door glass and B- and C-pillars being separated by the rear door glass.

The invention allows the use of an exterior trim element 1 comprising a glass cover part 3, particularly a semi- or chemically tempered or preferably annealed glass cover part 3 with enhanced functional properties relative to new design possibilities, a better scratch resistance, a better chemical resistance, and future possibilities to upgrade the glass trim element for example by affixing a logo, a laser engraving, a light, glass color and touch functionalities . . . .

The invention allows the use of glass, which are suitable for the visible surfaces of decorative parts, in particular high-gloss trim elements, in particular the use of shinny glass like Lacobel® glass from AGC.

The type of glass used for the cover part may be adapted to the constructive and structural mechanical requirements according to the geometry of the support member or inversely. The material for the cover part and the support member is chosen mainly to reach the decorative and/or an improved resistance properties.

Figure 4:
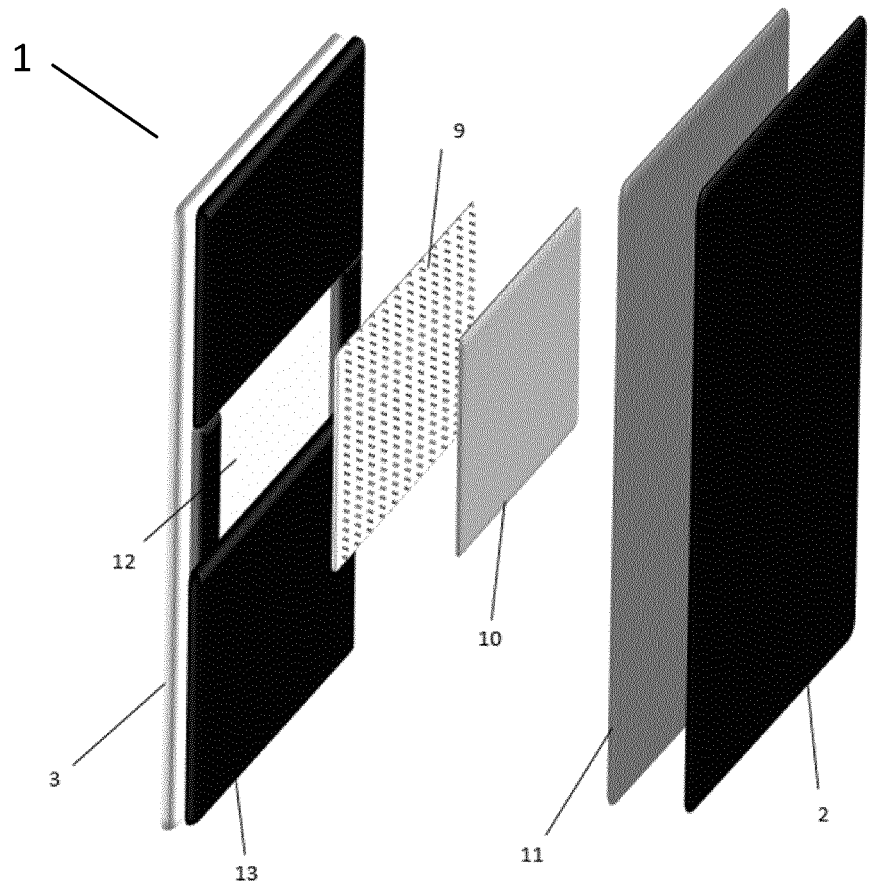
FIG. 4 shows a trim element according to the present invention with integrated lighting or display mean.

According to one embodiment of the present invention, FIG. 4 shows a trim element 1 according to the present invention with integrated electroluminescent foil 10 as lighting mean. When integrating features in an exterior glass trim element (also called applique) such as lighting or displays 10, it is needed to put a light emitting film or a display 10 between the glass cover part 3 and plastic backplate 2. The glass cover part 3 is made of a 1.6 mm annealed glass. Thus, the inner glass surface is not in direct contact with the glue 11 anymore (to fix the splinter in case of breakage). The back plate 2 is in this example made of PBT with 30% of glass Fiber.

For an aesthetic aspect, face 2 of the glass cover part 3 is at least partially covered with a black print 13 except the zone 12 which is free of black print to allow the light from the electroluminescent foil 10 to diffuse through this transparent zone 12.

According to one embodiment of the present invention, the trim element may integrate a display 10 instead or further to a lighting mean. Thus, the trim element (also called applique) may become the interface between car and driver (touch screen, bar code etc.)

To ensure the safety aspect also under this circumstances, the inner surface (at least the area of the lighting or display area) is preferably covered with an additional transparent splinter protection film or a transparent splinter protection paint 9. In case of an outer impact, this splinter protection film or protection paint 9 will keep the splinter in this glass area (lighting/display) on the exterior trim element 1 (also called applique). A splinter protection 9 may be for example an Opalfilm-liquid® film from Haverkamp company.

A colored semi-transparent splinter protection film or paint 9 may be used to get a colored logo in "off" mode (means during the days, when the back lighting of the logo is not needed). As a result, in "off" mode, it will be possible to create a colored customers logo. In "on" mode, this color will remain, but supported by the lighting function 10.

According to the present invention, the support member may have additional functional properties to improve the resistance of the trim element. The support member may comprise all means to fix the trim element to the vehicle body and/or to seal the trim element.

In the previously known applications, trim element as decorative parts for motor vehicles, are generally made of steel, aluminum or plastic. These materials present some disadvantages and particularly in terms of cost and/or limitation in their use and application (design, functionalities, scratch resistance, light reflection . . . ). Due to the specific requirements of car manufacturers for mounting (strength, torsional rigidity), weight of the vehicle (need to decrease constantly the weight of cars), and also in term of cost saving, while providing a good and safe aesthetic, the inventors propose a glass trim element according to the present invention.

Thus, the inventive multicomponent glass cover part/plastic support member of the exterior trim element allows to provide one solution to car manufacturers requirements. The main advantage is that the combination of glass cover part/plastic support member with different properties may overcome requirements of the customer which can be satisfied in terms of production costs and other properties. In addition, other functions such as sealing, etc. can be achieved by means of multi-component technology, for example the molding as a sealing and/or damping lip.

The invention claimed is:

1. An exterior trim element for a motor vehicle, comprising:
a cover part made of glass disposed on a support member, wherein the cover part is a soda-lime glass, and
wherein the cover part is configured to cover an A-, B-, C-, or D-pillar of a vehicle.

2. The exterior trim element according to claim 1, wherein the support member is made of a material selected from the group consisting of a thermoplastic plastic, a duroplastic, and a liquid silicone rubber material.

3. The exterior trim element according to claim 1, wherein the cover part is a tempered glass.

4. The exterior trim element according to claim 1, wherein the cover part is an annealed glass.

5. The exterior trim element according to claim 1, wherein the cover part has a thickness between 0.1 to 5 mm.

6. The exterior trim element according to claim 1, wherein a primer is disposed on at least a surface of the cover part in contact with the support member.

7. The exterior trim element according to claim 1, wherein the trim element is made by a multi-component injection molding process.

8. The exterior trim element according to claim 1, wherein the cover part is glued to the support member.

9. The exterior trim element according to claim 1, wherein the trim element further comprises a lighting or display means.

10. The exterior trim element according to claim 1, wherein the cover part is configured to an opaque element of a vehicle.

11. The exterior trim element according to claim 1, wherein the cover part has a thickness from 2.2 mm to 5 mm.

12. The exterior trim element according to claim 1, wherein the cover part has a thickness from 3 mm to 5 mm.

13. A method for manufacturing the exterior trim element for the motor vehicle according to claim 1 comprising:
fixing the glass cover part to the support member to form the trim element.

14. The method according to claim 13, wherein the support member is made of plastic.

15. The method according to claim 13, wherein the glass cover part is fixed to the support member by gluing.

16. The method according to claim 13, wherein the glass cover part is fixed to the support member by encapsulation.

17. The method according to claim 16, wherein the glass cover part is fixed to the support member by a 2K-encapsulation.

* * * * *